Patented Jan. 15, 1952

2,582,266

UNITED STATES PATENT OFFICE 2,582,266

SYNTHETIC RESINS FROM NATURAL POLYHYDROXY PHENOLS

Kenneth Potter Monroe, Boston, Mass., assignor to Standard Dyewood Company, Medford, Mass., a corporation of Massachusetts No Drawing. Application July 14, 1950,
Serial No. 173,942

9 Claims. (Cl. 260—54)

The present invention relates to the manufacture of useful and novel synthetic resins from natural polyhydroxy phenols, such as the various types of catechol tannins, and more particularly, quebracho extract.

It has long been known that the catechol type of tanning materials contain, or largely consist of, natural polyhydroxy phenolic materials, which have at least three hydroxyl groups, although these are not necessarily attached to the same phenyl group or benzene ring. It has also been proposed in the past to take advantage of the presence of such hydroxyl groups for the formation of synthetic resins, as by the condensation of such tanning materials with aldehydes, such as formaldehyde. The comparatively high reaction velocity of the nuclear hydrogen atoms in such compounds, however, made it very difficult to control the reaction, with the result that mostly insoluble and infusible products resulted, and that, therefore, no really useful products would be formed. Some advantage of this type of reaction was taken during World War II to produce molding compounds, which would serve as substitutes for the more carefully made phenolic types of resins. However, the difficulty of controlling the condensation and subsequent polymerization, made these compounds too erratic to permit them to find a market subsequent to the exigencies of the war.

The present invention radically differs from these prior proposals, in that a permanently soluble resinous product is produced, which lends itself to the preparation of various coating compositions, such as may be employed for the coating of leather, and cloth, paper, etc., having many of the characteristics of natural shellac, for which it forms an excellent substitute.

It is therefore one of the objects of the present invention to produce useful, organic-media-soluble synthetic resins from natural polyhydroxy phenolic materials, such as are exemplified by quebracho extract.

It is a further object of the present invention to provide a useful process for the conversion of natural polyhydroxy phenolic materials, exemplified by the catechol type of tanning materials, as for instance quebracho extract, into shellac substitutes.

A further object is to provide a process for the successive etherification of, for example, quebracho extract with a monohalogen lower fatty and with an aralkyl halide.

A further object is to produce resins by the action of choloroacetic acid, or its equivalent, upon quebracho extract, followed by condensation with formaldehyde, and final etherification of the resulting products with an aralkyl halide.

The present invention is predicated upon the reactiveness of the hydroxyl groups of natural polyhydroxy phenolic substances, such as the catechol types of tanning materials, for instance, quebracho extracts, with halogen lower fatty acids, such as chloroacetic acid, or bromo-acetic acids, or the corresponding propionic acid derivatives, in an alkaline medium to produce corresponding quebracho carboxy-alkyl ethers, there being sufficient alkali present to neutralize the hydrochloric acid which results from the reaction. The thus formed carboxy-alkyl ether sodium salt (or the equivalent if other than chloroacetic acid be used) is then reacted, still in an alkaline medium, with at least one mol of an aldehyde, such as formaldehyde, or a substance which yields an aldehyde, to form intermediate condensation products which remain dissolved in the reacting medium. These intermediate products are then further reacted with an aralkyl halide, for instance benzyl chloride, also in an alkaline environment, to form the sodium salts of the desired materials. From the solution thus obtained, the end product is precipitated by acidification with an acid, such as hydrochloric or sulfuric acid, the resin then being collected, as by filtration, and then dried and ground.

The theories and reactions which underlie the present invention may be illustrated as follows, using the arbitrary designation "T" to represent the main group of the tannin involved. "T" thus stands for a group which, according to the best available information, has about the following configuration:

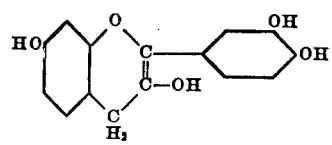

It will be seen that this has at least three phenolic hydroxyl groups, one being found on the left-hand (as written) phenyl group, and the other two being found, in the ortho positions relative to each other, in the right-hand phenyl group. There is also another hydroxyl group attached to a secondary carbon. For purposes of simplification, the fourth hydroxyl group will be disregarded, and the formula could thus be written as:

$$T(OH)_3$$

The final compounds obtainable by the processes of the present invention are methylol and polymethylene derivatives of the carboxy-alkyl ethers and aralkyl ethers of the natural polyhydroxy phenols, such as are exemplified by quebracho extract and similar types of catechol tanning materials.

In my copending application, Serial No. 173,941 filed concurrently with the present application, I have described synthetic resins produced by the treatment of a natural polyhydroxy phenolic substance successively with, for instance, chloroacetic acid and then with benzyl chloride (or their equivalents) in an alkaline medium, followed by ultimate acidification in order to liberate the desired resinous compounds. In accordance with the present invention, however, I interpose a condensation with an aldehyde between the two etherification steps.

Thus, while it is known that polyhydroxylic phenols in general will rapidly react with aldehydes, particularly formaldehyde, in both acid as well as alkaline media, with great ease and facility, the result is all too often a highly polymerized material which lacks the desired solubility in organic solvents, and, more particularly, is rather incompatible with other substances which it may be desired to employ in coating compositions based either upon other resins, various types of water-soluble and alcoholic-soluble proteins, for example zein.

In order to enable the more accurate control of the condensation of these materials with the aldehyde it has been found that a preliminary treatment to convert the polyhydroxy phenolic tanning materials into their corresponding carboxy-alkyl derivatives, thereby blocking some of the available hydroxyl groups, and thus directing the condensation with the higher reactive methylene compounds, such as for example formaldehyde, into the proper channels, is desirable. Briefly stated, the process comprises as the first step the etherification of a catechol type of natural tanning material with, for example, monochloroacetic acid or its sodium salt, in an alkaline medium. It will be self-evident that corresponding halogen compounds of other lower-fatty-acids may be employed: examples being chloroacetic acid, bromoacetic acid, chloropropionic acid, and bromopropionic acid, and the like.

The compound thus produced is then reacted with an aldehyde, in an alkaline medium, producing methylol and polymethylene derivatives thereof, which latter are then further etherified with an aralkyl halide, for example benzyl chloride. As the final etherification is also carried out in an alkaline medium, the compounds formed remain in solution in the form of their sodium salts, but are recoverable from the solution by acidification thereof which throws the products out in the form of a precipitate which may be recovered by filtration, whereafter it may be dried and ground to yield the desired end product of the present invention.

The reactions underlying the present invention, as already briefly stated, may be exemplified by the following reactions in which "T" stands for the general group:

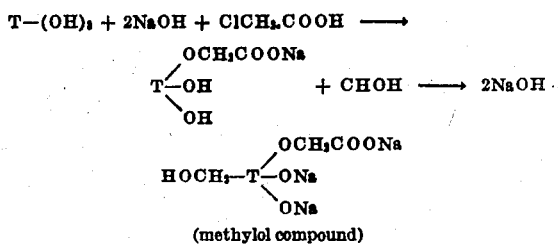

(methylol compound)

Self condensation yields

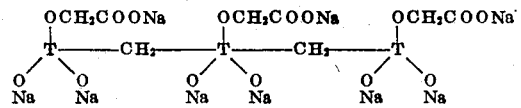

The final product is exemplified by the following structural formula:

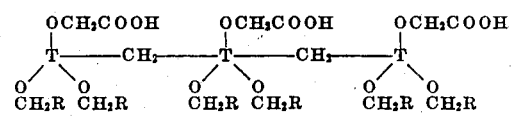

although it is to be understood that there is great probability that it consists of a polymer thereof, of undetermined molecular weight. This of course is characteristic of many of the synthetic resins. However, the product, irrespective of its complexity, remains soluble in organic solvents such as aromatic hydrocarbons for instance benzene, toluene, and its homologues, and alcohols, such as methyl, ethyl or propyl alcohol, or preferably mixtures of an aromatic hydrocarbon with such an alcohol.

The products, as will be expected from their acidic nature, are also soluble in alkalies, which therefore makes them a highly useful material for the formulation of various types of coating compositions.

Purely for purposes of exemplification and without intention to limit the invention in any way, there will be now given a detailed description of one method of producing the compounds of the present invention, this example being predicated upon the use of quebracho extracts. For example, 1280 grams of a quebracho containing about 50% of solids, of which about 3% are sodium bisulphite, were placed in a 4 liter beaker which was placed in a water bath and was equipped with a thermometer and an efficient mechanical agitator. The quebracho extract was then diluted with about 640 ml. of tap water, the mixture being stirred until homogeneous. Provisions were made for cooling the beaker with running water, and there were then added a solution of 229 grams of sodium hydroxide dissolved in 250 ml. of water, the beaker being cooled so that the temperature of the reacting mixture would at no time exceed about 40° C. The stirring was continued at about this temperature until all of the monochloroacetic acid had dissolved, and the mixture had again appeared homogeneous.

Moreover, the cooling was discontinued and the contents of the beaker slowly heated to raise it to a temperature of about from 70° to 75° C., being held within this latter range for about two hours. Thereafter the temperature was further raised to 90° to 95° C., and held within this temperature range for about thirty minutes. This completed the first step in the synthesis and resulted in the solution containing the sodium salt of a carboxy-methyl ether of quebracho tannin together with some sodium chloride which is the other product of the reaction.

The completed reaction product thus made was poured into a three-necked 5 liter flask which was placed in a water bath, this flask being equipped with an efficient mechanical agitator and thermometer, and also fitted with a reflux condenser. Means were also provided for externally cooling the flask.

By this cooling method the temperature of the mixture which had been poured into the flask was brought down to about 25° C. and maintained at this temperature by cooling during the time a solution of 213 grams of sodium hydroxide in 250 ml. of water were added, the cooling being so adjusted that the temperature at no time exceeded about 40° C. Thereafter there were added 300 ml. of water, plus 162 grams of a 37% solution of commercial formaldehyde, the flask being cooled so that the temperature would not exceed about 45° C. during the addition of the formaldehyde. After about fifteen minutes of agitation of the mixture at a temperature range between 40° and 45° C., the temperature of the reacting mixture was raised to about 70° to 75° C., and maintained there, while the agitation was continued for approximately thirty minutes. Tests then made showed that the odor of the formaldehyde had become less and less marked during this period, but in order completely to react the formaldehyde to the point where a test therefor could no longer be obtained, the temperature of the reaction mixture was finally raised to 90° to 95° C., and maintained within that temperature range for about two hours. This completed the second step of the synthesis, resulting in an aqueous solution of the sodium salt of the formaldehyde condensation product of the carboxy-methyl derivative of quebracho tannin. The viscosity of these reaction mixtures was noticeably higher than at the beginning of the reaction, showing that condensation had taken place.

The third step of the reaction was carried out in the same flask. By agitation and external cooling the temperature of the reaction mixture was lowered to about 45° C. whereupon 677 grams of benzyl chloride were added incrementally at such a rate that the temperature at no time would exceed about 45° C. Thereafter the temperature was raised to about 50° to 55° C. and maintained there for about ten minutes, then raised to 60° to 65° C., held for fifteen minutes, and then raised to 70° to 75° C., and held within the latter range of temperature for about two hours. In the meantime 30 grams of sodium hydrosulfite and 15 grams of sodium hydroxide were dissolved in 300 ml. of water, and the resulting solution added to the reaction mixture, the purpose being to bleach the formed resinous material.

The entire mass, including the aqueous component, was then poured while still hot into porcelain trays where the soapy mass solidified into a hard mass with a supernatent layer of aqueous sodium chloride solution.

In order to obtain the free resin, two charges prepared above in two 5 liter flasks were combined and acidified as follows:

A 5 gallon enamel container was equipped with efficient mechanical agitation and was charged with about 2000 ml. of water and 2000 grams of cracked ice and 750 ml. of concentrated (36%) hydrochloric acid, the mixture being stirred until homogeneous. The product of the two charges as above described was then added, as rapidly as feasible, to this cold hydrochloric acid with continued vigorous mechanical agitation. This decomposed the sodium salt of the compound which had been produced, thereby liberating the free resin which is an acid resin and which is insoluble in water. The agitation was continued until the mass was homogeneous, and all lumps of the solid soap had completely disappeared. The resulting slurry of resin was then filtered through a large suction funnel, as for example a Buchner funnel, using a glass fabric as a filter medium, the resin thus obtained being washed with cool water until substantially free from sodium chloride and hydrochloric acid. The thus washed filter cake was then removed from the funnel, spread out on porcelain trays, and dried with a forced air draft at a temperature not exceeding about 70° C. until it had reached a substantially constant weight.

This yielded one of the ultimate products of the present invention, namely, the quebracho monocarboxy-alkyl dibenzyl ether methylol and polymethylene derivative, which I prefer to abbreviate as "MX—F—DB" resin.

This is a yellowish to orange-colored resinous appearing material which retains its solubility in organic solvents as hereinabove already referred to, and which, by reason of its acidic nature, is also soluble in alkalies. This acidic nature of the resin has further advantages in that it aids in the formulation of coating compositions in which alcohol-soluble proteins, such for example as zein, are used.

Without essentially changing the manipulative details, but by using two mols of monochloroacetic acid, and only one mol of the benzyl chloride, and one mol of formaldehyde, I can also produce what I would prefer to abbreviate as the DX—F—MB, or dicarboxy-alkyl-monobenzyl methyl and polymethylene derivative resin.

Similarly, by using two mols of formaldehyde for the second step, I can produce MX—2F—DB, i. e. the monocarboxy-alkyl-dibenzyl condensation product with two formaldehyde or methylene linkages. Obviously, by starting with the dicarboxy-alkyl derivative and using two mols of formaldehyde and only one mol of benzyl chloride, I can obtain what could be abbreviated as the DX—2F—MB, or dicarboxy-alkyl monobenzyl methylol or polymethylene derivative. The only changes are the relative molar proportions of the reacting ingredients employed. The methods of introduction of the monochloroacetic acid, the formaldehyde and the benzyl chloride remain the same; as does the final liberation of the free acidic resin by means of an acid, as described.

It will of course be understood that the molar amounts of sodium hydroxide employed will be correspondingly modified; all this being fully within the skill of the chemist compounding these materials, so that a detailed description of the manufacture of each of these modifications would be superfluous. It is also evident that the gram-amounts will be changed if another halogen-lower-fatty acid be employed, and if another aralkyl chloride is used for the final etherification.

In my copending application, Serial No. 173,943 I have described a number of coating compositions in which the resins prepared in accordance with the present invention form one of the active ingredients, and I refer to said application for details for the further utilization of the compounds of the present invention.

While the invention has been described particularly in connection with that type of catechol tanning material commercially known as quebracho extract, it will be evident to those skilled in the art, particularly tanning, that other tanning agents such as wattle, cutch and mangrove, may be substituted for the quebracho extract. The quebracho extract is of course a well known article of commerce, being derived from the hogged and chipped wood of the quebracho tree which grows in great abundance in the central portion of South America, and is also found in other parts of the world. Wattle, on the other hand, is primarily a product of South Africa, while cutch and mangrove are found in other parts of the southern hemisphere, and in equatorial regions of the world.

I claim:

1. Process of making a synthetic resin which comprises etherifying quebracho extract in an alkaline medium with not more than about two molecular equivalents of sodium monochloroacetate, condensing the product thus formed with formaldehyde, and then etherifying the material thus formed with not more than about two molecular equivalents of benzyl chloride.

2. Process of making a synthetic resin which comprises the steps of etherifying quebracho tannin with not more than about two molecular equivalents of sodium monochloroacetate in an alkaline medium to produce a quebracho carboxyalkyl acid, condensing said acid with at least one mol of formaldehyde, and then etherifying the product thus produced with not more than about two molecular equivalents of an aralkyl halide.

3. Process of producing a synthetic resin which comprises etherifying at least one phenolic hydroxyl group of a catechol type of tanning agent by means of an alpha mono-halogen saturated fatty acid having from two to three carbon atoms, and in which the halogen is from the group consisting of chlorine and bromine, by reaction in an alkaline medium with not exceeding about two molecular equivalents of said acid, condensing the product thus formed with formaldehyde, and thereafter etherifying at least one of the remaining phenolic hydroxyl groups by reaction with an aralkyl halide in an alkaline aqueous medium.

4. Process of producing a synthetic resin which comprises etherifying at least one phenolic hydroxyl group of a catechol type of tanning agent by means of an alpha mono-halogen saturated fatty acid having from two to three carbon atoms, and in which the halogen is from the group consisting of chlorine and bromine, by reaction in an alkaline medium with not exceeding about two molecular equivalents of said acid, condensing the product thus formed with formaldehyde, and thereafter etherifying at least one of the remaining phenolic hydroxyl groups by reaction with a benzyl halide in an alkaline aqueous medium.

5. Process of producing a synthetic resin which comprises etherifying at least one phenolic hydroxyl group of quebracho tannin by reaction with not exceeding about two molecular equivalents of alpha chloroacetic acid in an alkaline medium, condensing the product thus formed with formaldehyde and thereafter etherifying at least one of the remaining phenolic hydroxyl groups by reaction with benzyl chloride in an alkaline medium.

6. As a new composition of matter, an aralkyl ether of a formaldehyde condensation product of a carboxy-alkyl ether of a member of the group of catechol type of tanning agents, one to two of the phenolic hydroxyl groups of said tanning agent being etherified by aralkyl radicals and the remaining phenolic hydroxyl groups being etherified by carboxy-alkyl radicals, the latter containing two to three carbon atoms.

7. As a new composition of matter, an aralkyl ether of a formaldehyde condensation product of a carboxy-alkyl ether of quebracho tannin, one to two of the phenolic hydroxyl groups of said tannin being etherified by aralkyl radicals and the remaining phenolic hydroxyl groups being etherified by carboxy-alkyl radicals, the latter containing two to three carbon atoms.

8. The composition as defined in claim 7 in which there are two benzyl and one carboxyalkyl radicals.

9. The composition as defined in claim 7 in which there are two carboxy-alkyl and one benzyl radicals.

KENNETH POTTER MONROE.

No references cited.